(12) United States Patent
Li et al.

(10) Patent No.: US 11,715,441 B2
(45) Date of Patent: Aug. 1, 2023

(54) VIRTUAL REALITY DISPLAY DEVICE, HOST DEVICE, SYSTEM AND DATA PROCESSING METHOD

(71) Applicants: Beijing BOE Optoelectronics Technology Co., Ltd., Beijing (CN); BOE Technology Group Co., Ltd., Beijing (CN)

(72) Inventors: Wenyu Li, Beijing (CN); Jinghua Miao, Beijing (CN); Lili Chen, Beijing (CN); Hao Zhang, Beijing (CN); Shaolei Zong, Beijing (CN); Xin Duan, Beijing (CN); Jigang Sun, Beijing (CN); Wei Sun, Beijing (CN)

(73) Assignees: Beijing BOE Optoelectronics Technology Co., Ltd., Beijing (CN); BOE Technology Group Co., Ltd., Beijing (CN)

( * ) Notice: Subject to any disclaimer, the term of this patent is extended or adjusted under 35 U.S.C. 154(b) by 38 days.

(21) Appl. No.: 17/362,944

(22) Filed: Jun. 29, 2021

(65) Prior Publication Data

US 2022/0157272 A1 May 19, 2022

(30) Foreign Application Priority Data

Nov. 13, 2020 (CN) .......................... 202011270953.1

(51) Int. Cl.
*G09G 5/02* (2006.01)
*G09G 5/00* (2006.01)

(52) U.S. Cl.
CPC .............. *G09G 5/02* (2013.01); *G09G 5/003* (2013.01); *G09G 2300/0804* (2013.01); *G09G 2300/0828* (2013.01); *G09G 2310/0297* (2013.01); *G09G 2330/028* (2013.01)

(58) Field of Classification Search
None
See application file for complete search history.

(56) References Cited

U.S. PATENT DOCUMENTS

| 10,467,948 | B2 * | 11/2019 | Kim | G09G 3/2092 |
| 10,859,823 | B1 * | 12/2020 | Choi | G02B 27/0101 |
| 2011/0261041 | A1 * | 10/2011 | Cheng | G09G 3/3688 |
| | | | | 345/208 |
| 2020/0265771 | A1 * | 8/2020 | Parks | G02B 27/0172 |
| 2020/0380904 | A1 * | 12/2020 | Yeh | G09G 3/3696 |
| 2021/0201754 | A1 * | 7/2021 | Seo | G09G 3/035 |

* cited by examiner

*Primary Examiner* — Andre L Matthews
(74) *Attorney, Agent, or Firm* — Ling Wu; Stephen Yang; Ling and Yang Intellectual Property

(57) ABSTRACT

Provided are a virtual reality display device, a host device, a system and a data processing method. The virtual reality display device includes a display panel and a drive chip, wherein the drive chip includes a first processing module and a drive module; the first processing module is configured to decode an image to be decoded with a third color depth sent by a second processing module in a virtual reality host device to obtain a first image with a first color depth and a second image with a second color depth, the third color depth is greater than or equal to the first color depth, and the second color depth is less than the first color depth; the drive module is configured to generate a first data voltage corresponding to the first image and a second data voltage corresponding to the second image.

15 Claims, 8 Drawing Sheets

Obtain first data for generating a first image with a first color depth for display in a fixation region in a display panel of a virtual reality display device and second data for generating a second image with a second color depth for display in n non-fixation region in the display panelact ⎯501

Render the first image based on the first data, and render the second image based on the second data through an image rendering module in the virtual reality host device ⎯502

Encode the first image and the second image to obtain an image to be decoded with a third color depth based on the first color depth and the second color depth ⎯503

Sending the image to be decoded to the virtual reality display device ⎯504

FIG. 5

| 1 | 2 | 3 | 4 |
|---|---|---|---|
| 5 | 6 | 7 | 8 |
| 9 | 10 | 11 | 12 |
| 13 | 14 | 15 | 16 |

FIG. 6A

VIRTUAL REALITY DISPLAY DEVICE, HOST DEVICE, SYSTEM AND DATA PROCESSING METHOD

CROSS-REFERENCE TO RELATED APPLICATION

The present application claims the priority of Chinese Patent Application No. 202011270953.1 filed to the CNIPA on Nov. 13, 2020, the content of which is hereby incorporated by reference.

TECHNICAL FIELD

Embodiments of the present disclosure relate to, but are not limited to, the technical field of display technologies, in particular to a virtual reality display device, a host device, a system and a data processing method.

BACKGROUND

The Virtual Reality (VR) technology has been appreciated highly by the market in recent years. VR technology may create a three-dimensional environment (i.e. virtual scene), and provide users with a sense of immersion through the three-dimensional environment.

With the development of the display industry, users have an increasingly high requirement for display quality, especially in specific display scenes such as VR, AR, immersive games and racing sports, which have high requirement for specification such as high resolution and high frame rate of display device. At present, problems of dynamic blur, display ghosting and low definition are serious under conventional display frequency, while increasing refresh frequency and resolution of display will directly lead to the multiplication of display transmission data, and will further lead to a higher data transmission bandwidth and higher power consumption of display device, thus seriously affecting immersive experience of users in display device.

SUMMARY

The following is a summary of subject matter described in detail herein. This summary is not intended to limit the protection scope of the claims.

Embodiments of the present disclosure mainly provide following technical solutions.

In a first aspect, an embodiment of the present disclosure provides a virtual reality display device, which includes a display panel and a drive chip, wherein, the drive chip includes a first processing module and a drive module, wherein the drive module is connected to the first processing module and the display panel;

the first processing module is configured to decode an image to be decoded with a third color depth sent by a second processing module in a virtual reality host device to obtain a first image with a first color depth displayed in a fixation region of the display panel and a second image with a second color depth displayed in a non-fixation region of the display panel, wherein the third color depth is greater than or equal to the first color depth and the second color depth is smaller than the first color depth;

the drive module is configured to generate a first data voltage corresponding to the first image based on the first image and a second data voltage corresponding to the second image based on the second image; apply the first data voltage to the fixation region of the display panel and apply the second data voltage to the non-fixation region of the display panel to drive the display panel to display an image with the first color depth in the fixation region and to display the image with the second color depth in the non-fixation region.

In a second aspect, an embodiment of the present disclosure provides a data processing method applied to a virtual reality display device. The method includes: decoding an image to be decoded with a third color depth sent by a virtual reality host device to obtain a first image with a first color depth displayed in a fixation region of a display panel of the virtual reality display device and a second image with a second color depth displayed in a non-fixation region of the display panel, wherein the third color depth is greater than or equal to the first color depth and the second color depth is smaller than the first color depth; generating a first data voltage corresponding to the first image based on the first image and a second data voltage corresponding to the second image based on the second image; apply the first data voltage to a fixation region of the display panel and apply the second data voltage to a non-fixation region of the display panel to drive the display panel to display an image with a first color depth in the fixation region and to display the image with a second color depth in the non-fixation region.

In a third aspect, an embodiment of the present disclosure provides a virtual reality host device, which includes a second processing module and an image rendering module connected to the second processing module, wherein, the second processing module is configured to obtain first data for generating a first image with a first color depth displayed in a fixation region in a display panel of a virtual reality display device and second data for generating a second image with a second color depth displayed in a non-fixation region in the display panel; control the image rendering module to render the first image based on the first data and render the second image based on the second data; encode the first image and the second image based on the first color depth and the second color depth to obtain an image to be decoded with a third color depth; send the image to be decoded to a first processing module in the virtual reality display device, wherein the third color depth is greater than or equal to the first color depth, and the second color depth is smaller than the first color depth.

In a fourth aspect, an embodiment of the present disclosure provides a data processing method applied to a virtual reality host device, the method including: obtaining first data for generating a first image with a first color depth displayed in a fixation region in a display panel of a virtual reality display device and second data for generating a second image with a second color depth displayed in a non-fixation region in the display panel; wherein the second color depth is smaller than the first color depth, rendering the first image based on the first data and rendering the second image based on the second data through an image rendering module in the virtual reality host device; encoding the first image and the second image to obtain an image to be decoded with a third color depth based on the first color depth and the second color depth, wherein the third color depth is greater than or equal to the first color depth; sending the image to be decoded to the virtual reality display device.

In a fifth aspect, an embodiment of the present disclosure provides a virtual reality system, which includes any of the above-mentioned virtual reality display device and any of the above-mentioned virtual reality host device.

Other features and advantages of the present disclosure will be set forth in the following specification, and will become apparent partially from the specification, or be understood by practice of the present disclosure. Other advantages of the present disclosure may be realized and obtained by the solutions described in the specification and drawings.

Other aspects will become apparent upon reading and understanding accompanying drawings and the detailed description.

BRIEF DESCRIPTION OF DRAWINGS

Accompanying drawings are used to provide a further understanding of technical solutions of the present disclosure, form a part of the specification, and explain technical solutions of the present disclosure together with embodiments of the present disclosure, while they do not constitute a limitation on the technical solutions of the present disclosure. Shapes and sizes of each component in the drawings do not reflect true proportions and only to be used to schematically illustrate contents of the present disclosure.

FIG. 5 is another schematic flowchart of a data processing method according to an embodiment of the present disclosure;

FIG. 6A is a schematic diagram of a second image with a second color depth according to an embodiment of the present disclosure;

DETAILED DESCRIPTION

Figure 1:
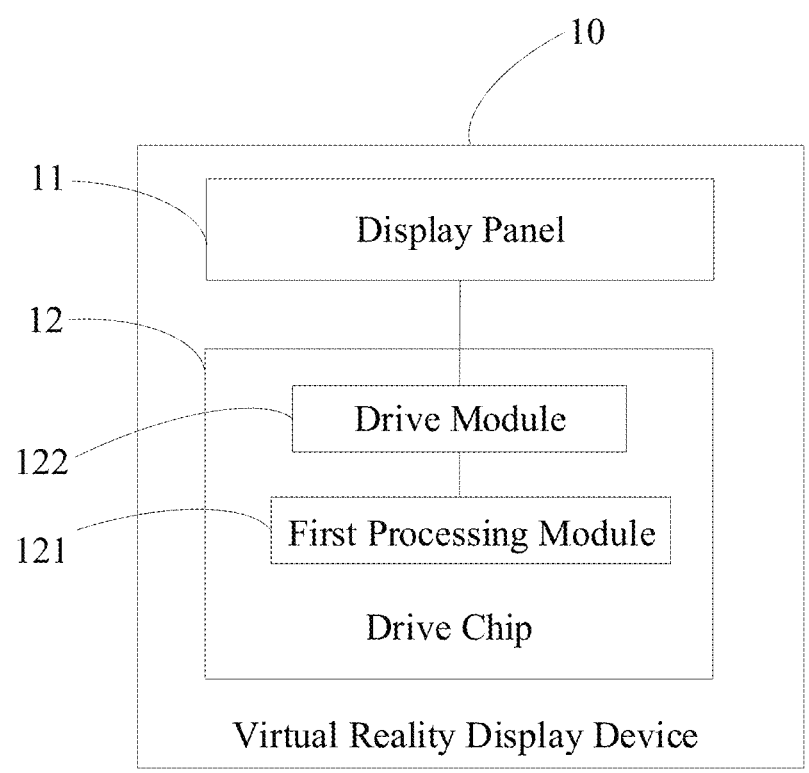
FIG. 1 is a schematic diagram of a structure of a virtual reality display device according to an embodiment of the present disclosure.

Multiple embodiments are described in the present disclosure, but the description is exemplary rather than limiting, and there may be more embodiments and implementation solutions within the scope of the embodiments described in the present disclosure. Although many possible combinations of features are shown in the drawings and discussed in the embodiments, many other combinations of the disclosed features are also possible. Unless specifically limited, any feature or element of any embodiment may be used in combination with or in place of any other feature or element of any other embodiment.

When describing representative embodiments, the specification may have presented methods and/or processes as a specific sequence of acts. However, to the extent that the method or process does not depend on the specific order of acts described herein, the method or process should not be limited to the specific order of acts described. As those of ordinary skills in the art will understand, other orders of acts are also possible. Therefore, the specific order of acts set forth in the specification should not be interpreted as limiting the claims. In addition, the claims for the method and/or process should not be limited to performing their acts in the written order, and those of skilled in the art may readily understand that these orders may vary and still remain within the spirit and scope of the embodiments of the present disclosure.

Unless otherwise defined, technical terms or scientific terms used in the embodiments of the present disclosure shall have common meanings as construed by those of ordinary skills in the art to which the present disclosure pertains. The words "first", "second" and the like used in the embodiments of the present disclosure do not represent any order, quantity or importance, but are merely used to distinguish among different components. Similar words such as "including" or "containing" mean that elements or articles appearing before the word cover elements or articles listed after the word and their equivalents, without excluding other elements or articles. Similar words such as "connect" or "link" are not limited to physical or mechanical connections, but may include electrical connections, whether direct or indirect.

Before introducing the embodiments of the present disclosure in detail, the terms involved in the embodiments of the present disclosure are explained here:

VR technology is a technology that uses VR device to close people's vision and even hearing to the outside world, so as to guide users to produce a sense of being in a virtual three-dimensional environment. The display principle is that a display screen corresponding to a left eye and/or a right eye displays images for the left eye and/or the right eye. Because of a parallax of human eyes, brains have a close-to-real stereoscopic impression after acquiring images with differences through the human eyes. The VR technology may usually be implemented by a VR system, which may include a VR display device and a VR host device. Wherein, the VR host device may be integrated into the VR display device, or an external computer device that may be wiredly or wirelessly connected to the VR display device. Generally speaking, the VR host may be used to render images and send the rendered images to the VR display device; the VR display device may be used to receive and display the rendered image.

Eye tracking technology, or eye ball tracking technology, is a technology that collects eye images of human eyes to analyze eye movement information of the human eyes and determine current fixation points of the human eyes on a display panel of a virtual reality display device based on the eye movement information. Further, in the eye tracking technology, the fixation region of the human eyes on the display panel of the virtual reality display device may be determined according to the determined fixation point of the human eyes at present on the display panel of the virtual reality display device.

An embodiment of the present disclosure provides a virtual reality display device. FIG. 1 is a schematic diagram of a structure of a virtual reality display device according to an embodiment of the present disclosure. As shown in FIG. 1, the virtual reality display device 10 may include a display panel 11 and a drive chip 12, wherein, the drive chip 12 includes a first processing module 121 and a drive module 122 which is connected to the first processing module 121 and the display panel 11;

a first processing module 121 is configured to decode an image to be decoded with a third color depth sent by a second processing module in a virtual reality host device, and obtain a first image with a first color depth for display in a fixation region of the display panel 11 and a second image with a second color depth for display in a non-fixation region of the display panel 11, wherein the third color depth is greater than or equal to the first color depth and the second color depth is smaller than the first color depth;

a drive module 122 is configured to generate a first data voltage corresponding to the first image based on the first image and a second data voltage corresponding to the second image based on the second image; apply the first data voltage to the fixation region of the display panel 11 and apply the second data voltage to the non-fixation region of the display panel 11 to drive the display panel 11 to display an image with the first color depth in the fixation region and to display an image with the second color depth in the non-fixation region.

The color depth of the image to be decoded is greater than or equal to that of the first image, that is, the definition of the image to be decoded is greater than or equal to that of the first image. If the color depth of the second image is smaller than that of the first image, that is, the definition of the second image is lower than that of the first image, then the first image may be called a high-definition image and the second image may be called a low-definition image. Wherein, the color depth (also known as color bit depth or sub-pixel bit depth) refers to the quantity of bits used to represent each pixel in an image. The color depth determines the quantity of colors that each pixel of a color image may represent, or determines gray levels that each pixel of a gray image may represent. Therefore, in practical application, the larger the quantity of bits of the color depth of an image, the greater the amount of data representing the image, the higher the resolution of the image, and thus the greater the transmission bandwidth required for transmitting the image.

In an exemplary embodiment, a first color depth may be 10-bit, and a second color depth may be 6-bit; alternatively, the first color depth may be 8-bit, and the second color depth may be 4-bit, which is not limited in the embodiment of the present disclosure.

In an exemplary embodiment, a fixation region and a non-fixation region of a display panel in a virtual reality display device may be determined by an eye tracking technology.

In an exemplary embodiment, a virtual reality display device may be any type of wearable smart device such as a virtual reality helmet, virtual reality glasses, and a smart watch. For example, the virtual reality display device may be a virtual reality helmet, and a user may see an immersive virtual reality scene through a display panel of the virtual reality helmet when wearing the virtual reality helmet.

In an exemplary embodiment, a display panel in a virtual reality display device may include, but is not limited to, a liquid crystal display (LCD) panel, an organic light-emitting diode (OLED) display panel, etc.

It may be seen from the above that, the virtual reality display device according to the embodiments of the present disclosure on the one hand, may drive different regions of the display panel in the virtual reality display device according to different color depth requirements through a drive chip in the virtual reality display device, for example, to drive a fixation region in the display panel with a high color depth (that is, drive the fixation region to display images with a first color depth), which may ensure a better display effect of the fixation region, satisfy a user's visual experience and to drive a non-fixation region with a low color depth (that is, drive the non-fixation region to display images with a second color depth smaller than the first color depth), which may reduce a data transmission bandwidth and power consumption of the display device; on the other hand, an image to be decoded is transmitted between a virtual reality host device and the virtual reality display device without directly transmitting the first image and the second image, which may reduce the data transmission bandwidth and the power consumption of the display device. Therefore, visual requirements of users with high resolution and high frame rate may be met, and the data transmission bandwidth and power consumption of display devices may be reduced.

In an exemplary embodiment, a display panel may include M rows and N columns of sub-pixels and N columns of data lines, wherein an ith column of data lines is connected to an ith column of sub-pixels, M and N are positive integers, and i is a positive integer less than or equal to N; a drive module may include a voltage generation unit, a digital-to-analog conversion (DAC) unit and a multiplexer circuit, wherein, the multiplexer circuit is connected to N columns of data lines;

the voltage generation unit is configured to generate a first reference voltage for digital-to-analog conversion of a first digital voltage signal corresponding to a first image and generate a second reference voltage for digital-to-analog conversion of a second digital voltage signal corresponding to a second image;

the digital-to-analog conversion unit is connected to a first processing module, the voltage generation unit and the multiplexer circuit and is configured to perform a digital-to-analog conversion on the first digital voltage signal based on the first reference voltage to generate a first analog voltage signal corresponding to the first digital voltage signal, perform a digital-to-analog conversion on the second digital voltage signal based on the second reference voltage to generate a second analog voltage signal corresponding to the second digital voltage signal; and control the multiplexer circuit to apply the first analog voltage signal as a first data voltage to a fixation region in the display panel and apply the second analog voltage signal as a second data voltage to a non-fixation region in the display panel to drive the display panel to display an image in a first color depth in the fixation region and to display an image in a second color depth in the non-fixation region.

The quantity of digital-to-analog conversion units in the drive module is not limited in the embodiment of the present disclosure, and thus it may be one or two, alternatively, more digital-to-analog conversion units may be constructed according to the quantity of color depth types required by the display panel of the virtual reality display device.

In an exemplary embodiment, a voltage generation unit may have a resistance string voltage division structure.

In an exemplary embodiment, taking a voltage generation unit being an R-string voltage division structure as an example, the voltage generation unit may include a resistor string (R-string), a first output terminal and a second output terminal, wherein an input terminal of the voltage generation unit is connected to an output terminal of a first processing module; the R-string is configured to generate a first digital voltage signal corresponding to a first image and a second digital voltage signal corresponding to a second image based on a reference voltage; the first output terminal of the voltage generation unit is configured to output a first reference voltage for digital-to-analog conversion of the first digital voltage signal corresponding to the first image to a digital-to-analog conversion unit; the second output terminal of the voltage generation unit is configured to output a second reference voltage for digital-to-analog conversion of the second digital voltage signal corresponding to the second image to a digital-to-analog conversion unit, wherein the quantity of the second reference voltage is smaller than the quantity of the first reference voltage.

The quantity of output terminals in the voltage generation unit is not limited in the embodiment of the present disclosure, and thus it may be two or more output terminals may be constructed according to the quantity of color depth types required by the display panel of the virtual reality display device.

Figure 2:
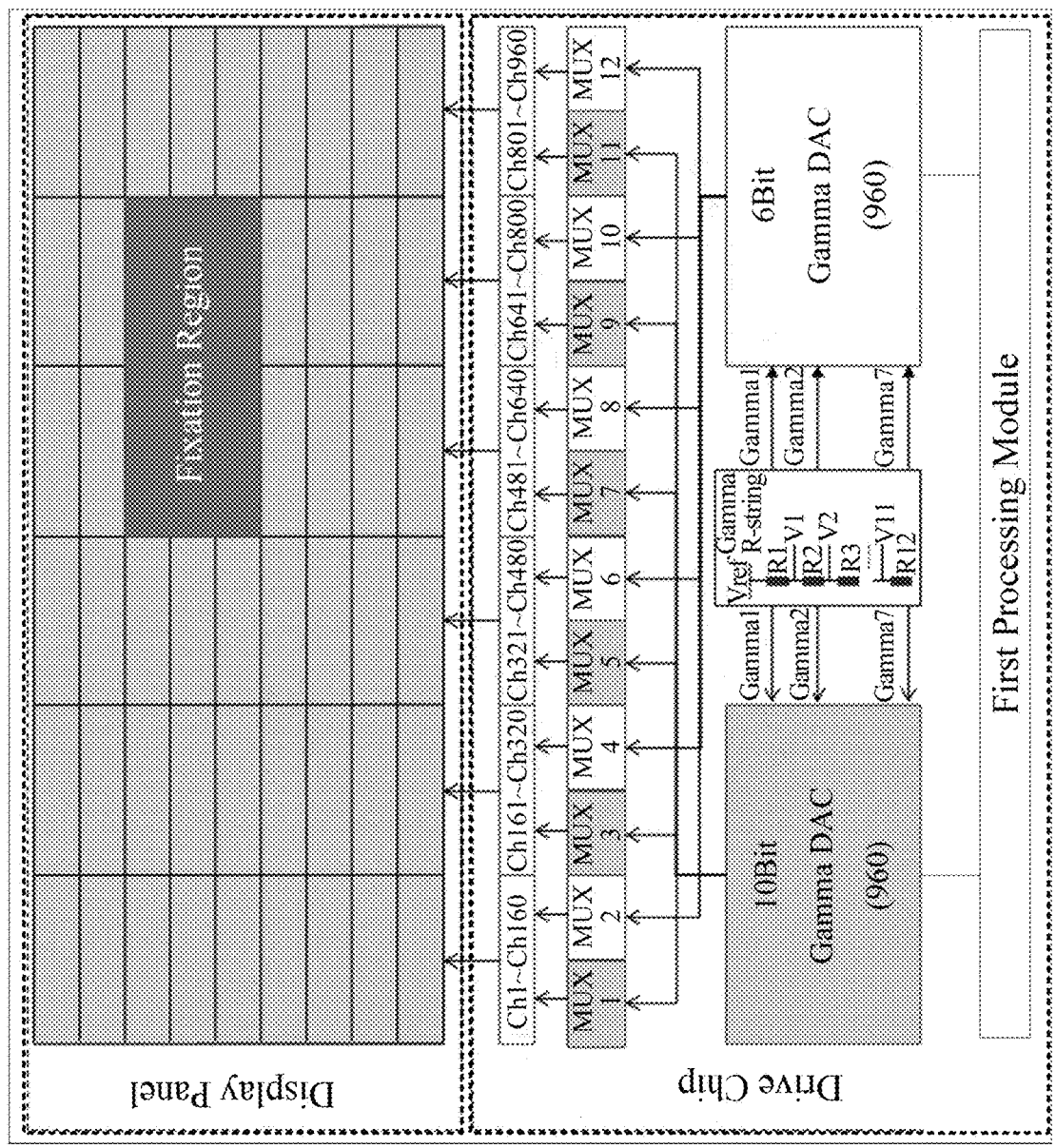
FIG. 2 is a schematic diagram of another structure of a virtual reality display device according to an embodiment of the present disclosure.

Taking the color depth required by the display panel of the virtual reality display device including a first color depth and a second color depth, the first color depth being 10-bit and the second color depth being 6-bit as an example, as shown in FIG. 2, the R-string (e.g., Gamma R-String in FIG. 2) may include twelve resistors R1 to R12 connected in series with equal resistance, wherein a first terminal of a first voltage divider resistor R1 is connected to an original reference voltage Vref; a second end of the first divider resistor R1 is connected to a first end of a second voltage divider resistor R2, a second end of the second voltage divider resistor R2 is connected to a first end of a third voltage divider resistor R3, . . . , a second end of an eleventh voltage divider resistor R11 is connected to a first end of a twelfth voltage divider resistor R12, and a second end of the twelfth voltage divider resistor R12 is grounded. In this way, by dividing the original reference voltage Vref, eleven reference voltages with equal interval voltages may be generated at a second end of each voltage divider resistor, wherein the eleven reference voltages may be marked as V1, V2, . . . , V11 in the order of voltage values from high to low.

For another example, as shown in FIG. 2, the first output terminal may output eleven first reference voltages Gamma1 to Gamma 11 to a digital-to-analog conversion unit (e.g., a 10-bit Gamma DAC), so that the digital-to-analog conversion unit (e.g., 10-bit Gamma DAC) converts the first digital voltage signal corresponding to the first image into a first analog voltage signal according to the eleven first reference voltages Gamma 1 to Gamma 11, and the second output terminal may output seven second reference voltages Gamma 1 to Gamma 7 to a digital-to-analog conversion unit (for example, 6-bit Gamma DAC), so that the digital-to-analog conversion unit (for example, 6-bit Gamma DAC) converts the second digital voltage signal corresponding to the second image into a second analog voltage signal according to the seven second reference voltages Gamma 1 to Gamma 7.

In an exemplary embodiment, the digital-to-analog conversion unit may include a first sub-digital-to-analog conversion unit and a second sub-data conversion unit, wherein, The first sub-digital-to-analog conversion unit includes a first input terminal, a second input terminal and an output terminal, wherein the first input terminal of the first sub-digital-to-analog conversion unit is connected to a first processing module, the second input terminal of the first sub-digital-to-analog conversion unit is connected to a first output terminal of a voltage generation unit, and the output terminal of the first sub-digital-to-analog conversion unit is connected to a multiplexer circuit. The first sub-digital-to-analog conversion unit is configured to perform digital-to-analog conversion processing on a first digital voltage signal to generate a first analog voltage signal corresponding to the first digital voltage signal; control the multiplexer circuit to apply a first analog voltage signal as a first data voltage to a fixation region in a display panel to drive the display panel to display an image with a first color depth in the fixation region;

The second sub-digital-to-analog conversion unit includes a first input terminal, a second input terminal and an output terminal, wherein the first input terminal of the second sub-digital-to-analog conversion unit is connected to a first processing module, the second input terminal of the second sub-digital-to-analog conversion unit is connected to a second output terminal of a voltage generation unit, and the output terminal of the second sub-digital-to-analog conversion unit is connected to the multiplexer circuit. The second sub-digital-to-analog conversion unit is configured to perform digital-to-analog conversion processing on a second digital voltage signal based on a second reference voltage to generate a second analog voltage signal corresponding to the second digital voltage signal; control the multiplexer circuit to apply a second analog voltage signal as a second data voltage to a non-fixation region in a display panel to drive the display panel to display an image with a second color depth in the non-fixation region; In this way, two sub-digital-to-analog conversion units may share a set of voltage generation units.

In an exemplary embodiment, a multiplexer circuit may include a first group of multiplexer units (MUX) and a second group of multiplexer units, wherein, the first group of multiplexer units includes N first multiplexer units, wherein an input terminal of an ith first multiplexer unit is connected to an output terminal of a first sub-digital-to-analog conversion unit, and an output terminal of the ith first multiplexer unit is connected to a data line in an ith column (i.e., the ith first multiplexer unit is connected to sub-pixels in the ith column through the data line in the ith column);

the second group of multiplexer units includes N second multiplexer units, wherein an input terminal of an ith second multiplexer unit is connected to an output terminal of a second sub-digital-to-analog conversion unit, and an output terminal of the ith second multiplexer unit is connected to the data line in the ith column (i.e., the ith second multiplexer unit is connected to the sub-pixels in the ith column through the data line in the ith column);

the first sub-digital-to-analog conversion unit is configured to control the first group of multiplexer units to apply a first analog voltage signal as a first data voltage to a fixation region in a display panel to drive the display panel to display an image with a first color depth in the fixation region;

the second sub-digital-to-analog conversion unit is configured to control the second group of multiplexer units to apply a second analog voltage signal as a second data voltage to a non-fixation region in a display panel to drive the display panel to display an image with a second color depth in the non-fixation region.

The virtual reality display device described above will be explained with an exemplary example.

In an exemplary embodiment, X sets of sub-digital-to-analog conversion modules (e.g., Gamma DAC) and X sets of multiplexer circuits (e.g., MUX gating circuits) may be designed in a drive chip (e.g., drive Integrated Circuit (IC)) according to the quantity X of color depth types required by the display panel of the virtual reality display device, and different regions of the display panel may be driven according to different color depth requirements.

For example, taking high color depth drive (e.g., 10 bit) for the fixation region and low color depth drive (e.g., 6 bit) for the non-fixation region as an example, the quantity X of color depth types required by the display panel of the virtual reality display device is 2, so as shown in FIG. 2, two sets of sub-digital-to-analog conversion modules may be disposed in the drive IC, which may include one set of a high color depth DAC (e.g., 10-bit Gamma DAC) and one set of a low color depth DAC (for example, 6-bit Gamma DAC), wherein the two sets of sub-digital-to-analog conversion modules share one set of voltage generation unit (for example, Gamma R-String), that is, the 10-bit Gamma DAC and 6-bit Gamma DAC share one set of Gamma R-String.

For example, as shown in FIG. 2, the display panel in the virtual reality display device may be vertically divided into a plurality of rows of pixel partitions, and each row of pixel partitions includes a plurality of rows of sub-pixels, for example, if the display panel includes M rows and N columns of sub-pixels, it may include 9 rows of pixel partitions, and each row of pixel partitions includes M/9 rows of sub-pixels; for example, if M is equal to 540, each row of pixel partitions includes 60 rows of sub-pixels. The display panel in the virtual reality display device may be horizontally divided into a plurality of columns of pixels partitions, and each column of pixel partitions includes a plurality of columns of sub-pixels. For example, if the display panel includes M rows and N columns of sub-pixels, it may be divided into six columns of pixel partitions, and each column of pixel partitions includes N/6 rows of sub-pixels; for example, if N is equal to 960, each column of pixel partitions may include 160 columns of sub-pixels.

For example, as shown in FIG. 2, each column of pixel partitions corresponds to a first multiplexer unit (i.e., odd MUX) and a second multiplexer unit (i.e., even MUX). If the display panel includes 540 rows and 960 columns of sub-pixels and the display panel is divided into 9 rows and 6 columns of pixel partitions, the multiplexer circuit may include a total of 12 multiplexer units MUX1 to MUX12. First group of multiplexer units may include: MUX1, MUX3, MUX5, MUX7, MUX9 and MUX11, 6 first multiplexer units in total, and each first multiplexer unit may include 160 first sub-multiplexer units; first group of multiplexer units may include: MUX2, MUX4, MUX6, MUX8, MUX10 and MUX12, 6 second multiplexer units in total, and each second multiplexer unit may include 160 first sub-multiplexer units. Wherein, a group of odd MUX units (i.e., the first group of multiplexer units) is connected to a 10-bit Gamma DAC (i.e., a first sub-digital-to-analog conversion unit), and a group of even MUX units (i.e., a second group of multiplexer units) is connected to a 6-bit Gamma DAC (i.e., a second sub-digital-to-analog conversion unit).

Locations of a user's fixation region and non-fixation region on the virtual reality display device is obtained by eye tracking technology (for example, as shown in FIG. 2, if the display panel of the virtual reality display device includes 540 rows and 960 columns of sub-pixels and the display panel is divided into 9 rows and 6 columns of pixel partitions, a region where pixel partitions in the third to fifth rows intersect with pixel partitions in the fourth to fifth columns in the display panel is a fixation region, and other regions except the fixation region may be non-fixation regions). The virtual reality host device transmits an image to be decoded (that is, an image with a third color depth containing a first image and a second image) to a first processing module in the virtual reality display device; the first processing module decodes the image to be decoded to obtain a first image to be displayed (i.e., an image with a first color depth displayed in the fixation region of the display panel) and a second image to be displayed (i.e., an image with a second color depth displayed in the non-fixation region of the display panel), and then the first processing module sends a first digital voltage signal corresponding to the first image (i.e., data of the fixation region with a high color depth) and a second digital voltage signal corresponding to the second image (i.e., data of the fixation region with a low color depth) to a digital-to-analog conversion unit; next, a voltage generation unit (e.g., Gamma R-String) in the virtual reality display device generates a first reference voltage for digital-to-analog conversion of the first digital voltage signal corresponding to the first image and a second reference voltage for digital-to-analog conversion of the second digital voltage signal corresponding to the second image, and the voltage generation unit in the virtual reality display device transmits the first reference voltage to the first sub-digital-to-analog conversion unit (e.g., 10 bit gamma DAC), so that the first sub-digital-to-analog conversion unit (e.g., 10 bit gamma DAC) performs digital-to-analog conversion processing on the first digital voltage signal based on the first reference voltage, generates the first analog voltage signal corresponding to the first digital voltage signal, and controls the corresponding first multiplexer unit in the first group of multiplexer units to drive the display panel to display an image with a first color depth in the fixation region (i.e., to display with a high color depth in the fixation region); furthermore, the voltage generation unit in the virtual reality display device transmits the second reference voltage to the second sub-digital-to-analog conversion unit (e.g., 6 bit Gamma DAC), so that the second sub-digital-to-analog conversion unit (e.g., 6 bit Gamma DAC) performs digital-to-analog conversion processing on the second digital voltage signal based on the second reference voltage to generate the second analog voltage signal corresponding to the second digital voltage signal, controls the corresponding second multiplexer unit in the second group of multiplexer units to drive the display panel to display an image with a second color depth in the non-fixation region (i.e., to display an image with a low color depth in the non-fixation region).

For example, as shown in FIG. 2, only MUX2, MUX4, MUX6, MUX8, MUX10, and MUX12 (i.e., the second group of multiplexer units) are strobed when pixel partitions in rows 1 to 2 and pixel partitions in rows 6 to 9 of the display panel of the virtual reality display device are driven, and a 6-bit Gamma DAC (i.e., the second digital-to-analog conversion unit) operates to drive the corresponding non-fixation regions in the display panel (i.e., a region where pixel partitions in rows 1 to 2 intersect with pixel partitions in columns 1 to 6 and a region where pixel partitions in rows 6 to 9 intersect with pixel partitions in columns 1 to 6) for a low color depth display. Only MUX2, MUX4, MUX6, MUX7, MUX9 and MUX12 are strobed when pixel partitions in rows 3 to 5 of the display panel are driven, in which a 6-bit Gamma DAC drives the corresponding non-fixation regions in the display panel (i.e., a region where pixel partitions in rows 3 to 5 intersect pixel partitions in columns 1 to 3 and a region where pixel partitions in rows 3 to 5 intersect pixel partitions in column 6) to display with a low color depth. The 10-bit gamma DAC drives the corresponding fixation region in the display panel (i.e., a region where the pixel partitions in the rows 3 to 5 intersect the pixel partitions in columns 4 to 5 in the display panel) to display with a high color depth.

In an exemplary embodiment, a digital-to-analog conversion module that may be downwards compatible and switchable in real time may be designed in a drive chip (e.g., a drive IC) of a virtual reality display device, without designing a multiplexer circuit (i.e., a MUX circuit). For example, taking the digital-to-analog conversion module capable of downwards compatibility and real-time switching as a 10-bit gamma DAC as an example, when driving a fixation region to display with a high color depth, it may normally work in a 10-bit mode and apply a first data voltage corresponding to a first image with 10-bit color depth to the fixation region; when driving the fixation region to display with a high color depth, it may be switched to a 6-bit operation mode and apply a second data voltage corresponding to a second image with a 6-bit color depth to a non-fixation region.

Figure 3:
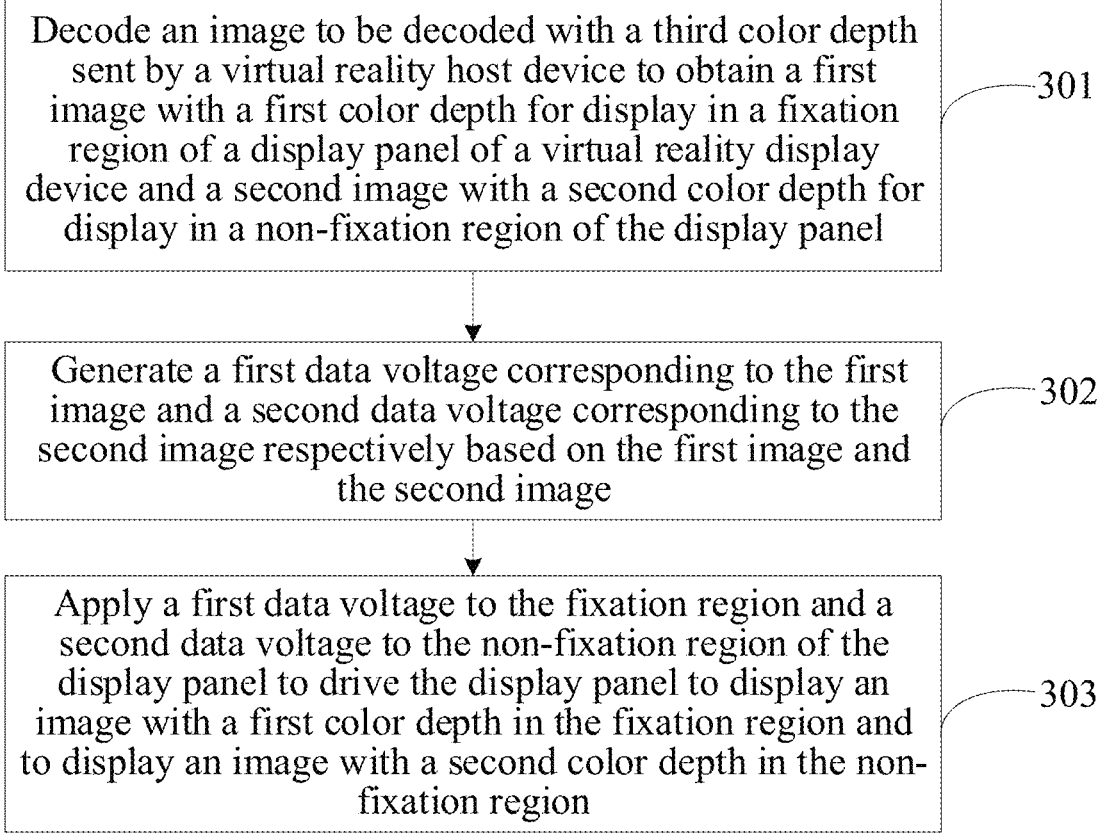
FIG. 3 is a schematic flowchart of a data processing method according to an embodiment of the present disclosure.

An embodiment of the present disclosure further provides a data processing method, which is applied to the virtual reality display device in one or more embodiments described above. FIG. 3 is a schematic flowchart of a data processing method according to an embodiment of the present disclosure. As shown in FIG. 3, the data processing method may include the following acts:

act 301: decoding an image to be decoded with a third color depth sent by a virtual reality host device to obtain a first image with a first color depth for display in a fixation region of a display panel of a virtual reality display device and a second image with a second color depth for display in a non-fixation region of the display panel, wherein the third color depth is greater than or equal to the first color depth, and the second color depth is smaller than the first color depth;

act 302: generating a first data voltage corresponding to the first image based on the first image and a second data voltage corresponding to the second image based on the second image;

act 303: applying a first data voltage to the fixation region and a second data voltage to the non-fixation region of the display panel to drive the display panel to display an image with a first color depth in the fixation region and to display an image with a second color depth in the non-fixation region.

It may be seen from the above that, the data processing method according to the embodiments of the present disclosure on the one hand, may drive different regions of the display panel in the virtual reality display device according to different color depth requirements through a drive chip in the virtual reality display device, for example, to drive a fixation region in the display panel with a high color depth (that is, drive the fixation region to display images with a first color depth), which may ensure a better display effect of the fixation region, satisfy a user's visual experience and to drive a non-fixation region with a low color depth (that is, drive the non-fixation region to display images with a second color depth smaller than the first color depth), which may reduce a data transmission bandwidth and power consumption of the display device; on the other hand, an image to be decoded is transmitted between a virtual reality host device and the virtual reality display device other than directly transmitting the first image and the second image, which may reduce the data transmission bandwidth and the power consumption of the display device. Therefore, different regions of the display panel in the virtual reality display device are driven according to different color depth requirements, which may not only meet visual requirements of users for high resolution and high frame rate, but also reduce data transmission bandwidths and power consumption of the display device.

Figure 4:
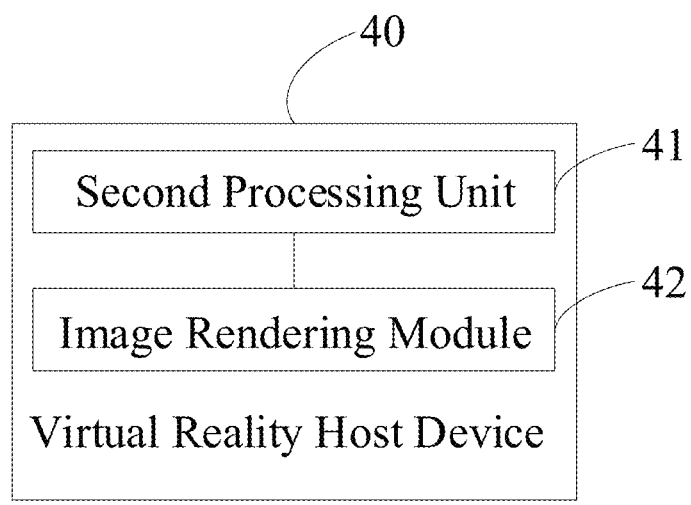
FIG. 4 is a schematic diagram of a structure of a virtual reality host device according to an embodiment of the present disclosure.

An embodiment of the present disclosure also provides a virtual reality host device. FIG. 4 is a schematic diagram of a structure of the virtual reality host device according to the embodiment of the present disclosure. As shown in FIG. 4, the virtual reality host device 40 may include a second processing module 41 and an image rendering module 42 connected to the second processing module 41, wherein, a second processing module 41 is configured to obtain first data for generating a first image with a first color depth for display in a fixation region in a display panel of a virtual reality display device and second data for generating a second image with a second color depth for display in a non-fixation region in the display panel; control the image rendering module 42 to render the first image based on the first data and to render the second image based on the second data; encode the first image and the second image based on the first color depth and the second color depth to obtain an image to be decoded with a third color depth; send the image to be decoded to a first processing module in the virtual reality display device, wherein the third color depth is greater than or equal to the first color depth, and the second color depth is smaller than the first color depth.

In an exemplary embodiment, an image rendering module on a virtual reality host device may be a rendering engine such as a GPU (Graphics Processing Unit), an FPGA (Field Programmable Gate Array), or a dedicated AI chip (or an AI accelerator or compute card), which is not limited in the embodiments of the present disclosure.

In an exemplary embodiment, a second processing module is configured to encode a first image and a second image to obtain an image to be decoded with a third color depth based on a first color depth and a second color depth, which may include: a second processing module configured to encode the second image based on whether the first color depth may be divided by the second color depth evenly to obtain an encoded second image with the first color depth when the third color depth is equal to the first color depth, and splice the first image and the encoded second image to obtain an image to be decoded.

In an exemplary embodiment, a second processing module is configured to encode a second image based on whether a first color depth may be divided by a second color depth evenly to obtain an encoded second image with the first color depth, which may include: the second processing module, configured to merge every K columns of pixel values in the second image into one column of pixel values in the encoded second image when the first color depth may be divided by the second color depth evenly, and generate the encoded second image, wherein K is a quotient obtained by dividing the first color depth by the second color depth evenly, and K is a positive integer greater than 1.

In an exemplary embodiment, a second processing module is configured to encode a second image to obtain an encoded second image with a first color depth based on whether a first color depth may be divided by a second color depth evenly, which may include: the second processing module, configured to merge every G column of pixel values and H columns blank pixel values in the second image into a column of pixel values in the encoded second image and generate the encoded second image, when the first color depth may not be divided by the second color depth evenly, wherein G is a quotient obtained by dividing the first color depth by the second color depth, H is a remainder obtained by dividing the first color depth by the second color depth, and G and H are positive integers greater than 1.

In an exemplary embodiment, a second processing module is configured to encode a first image and a second image to obtain an image to be decoded with a third color depth based on the first color depth and the second color depth, which may include the second processing module configured to encode the first image based on a common multiple between the first color depth and the second color depth when the third color depth is a common multiple between the first color depth and the second color depth; encode the second image to obtain an encoded second image with a third color depth based on a common multiple between the first color depth and the second color depth; splice the encoded first image and the encoded second image to obtain an image to be decoded.

In an exemplary embodiment, a second processing module is configured to encode a first image to obtain an encoded first image with a third color depth based on a common multiple between the first color depth and the second color depth, which may include the second processing module configured to merge every P columns of pixel values in the first image into a column of pixel values in the encoded first image to generate the encoded first image, where P is a quotient obtained by dividing a common multiple by the first color depth, and P is a positive integer greater than 1;

a second processing module is configured to encode a second image to obtain an encoded second image with a third color depth based on a common multiple between the first color depth and the second color depth, which may include the second processing module configured to merge every Q column of pixel values in the second image into a column of pixel values in the encoded second image to generate the encoded second image, where Q is a quotient obtained by dividing the common multiple by the second color depth, and Q is a positive integer greater than 1.

An embodiment of the present disclosure further provides a data processing method, which is applied to the virtual reality host device in one or more embodiments described above. FIG. 5 is another schematic flowchart of a data processing method according to an embodiment of the present disclosure. As shown in FIG. 5, the data processing method may include the following acts:

act 501: obtaining first data for generating a first image with a first color depth for display in a fixation region in a display panel of a virtual reality display device and second data for generating a second image with a second color depth for display in a non-fixation region in the display panel, wherein the second color depth is smaller than the first color depth;

act 502: rendering a first image (i.e., an image with a high color depth and an image with a high definition) based on first data, and rendering a second image (i.e., an image with a low color depth and an image with a low definition) based on second data through an image rendering module in the virtual reality host device;

act 503: encoding the first image and the second image to obtain an image to be decoded with a third color depth based on the first color depth and the second color depth, wherein the third color depth is greater than or equal to the first color depth;

act 504: sending the image to be decoded to the virtual reality display device.

In an exemplary embodiment, act 502 may include: rendering a second image (i.e., an image with a low color depth, an image with a low definition) based on second data according to the full field of view in each frame; rendering a first image (i.e., an image with a high color depth, an image with a high definition) based on the first data according to fixation point coordinates (the fixation point coordinates are calculated according to taken human eyeball images) and the corresponding viewing angle. In this way, data size of the second image (i.e., an image with a low color depth and an image with a low definition) is reduced, thereby reducing rendering pressure and improving rendering frame rate.

The sensor calculates the coordinates of the fixation point according to the taken human eyeball image, and transmits the coordinates to the rendering process. The software renders an image with a high definition according to the fixation point and the corresponding field of view angle, and a sub-pixel bit depth of the high-definition image is high.

In an exemplary embodiment, when the third color depth is equal to the first color depth, act 503 may include the following acts 5031 to 5032:

act 5031: encoding the second image to obtain an encoded second image with the first color depth based on whether the first color depth may be divided by the second color depth evenly.

act 5032: splicing the first image and the encoded second image to obtain an image to be decoded.

In the above embodiment, when the first color depth may be divided by the second color depth evenly, act 5031 may include merging every K columns of pixel values in the second image into a column of pixel values in the encoded second image to generate the encoded second image, where K is a quotient obtained by dividing the first color depth by the second color depth. In practical application, in the process of splicing and transmitting a first image with a first color depth and a second image with a second color depth (i.e., the process of splicing and transmitting an image with a high definition (which may be called an image with a high color depth or an image with a high bit depth) and an image with a low definition (which may be called an image with a low color depth or an image with a low bit depth), since spliced images may only be with the same pixel format, in order to ensure that the high-definition image remains unchanged, the second image with the second color depth (the image with the low color depth) needs to be converted into an image with a high color depth. If it is converted normally, the low bit depth rendering of the previous image with the low definition is of little significance. Therefore, in the embodiment of this disclosure, a new encoding method is adopted to merge K sub-pixels in the image with a low color depth into one pixel in an image with a high color depth pixel format. In this way, data volume of spliced images may be greatly reduced and transmission bandwidths may be reduced.

Figure 6B:
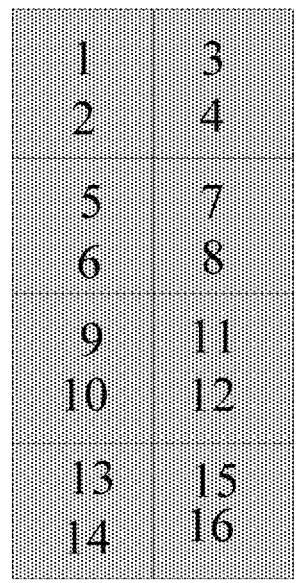
FIG. 6B is a schematic diagram of an encoded second image with a first color depth according to an embodiment of the present disclosure.
Figure 6C:
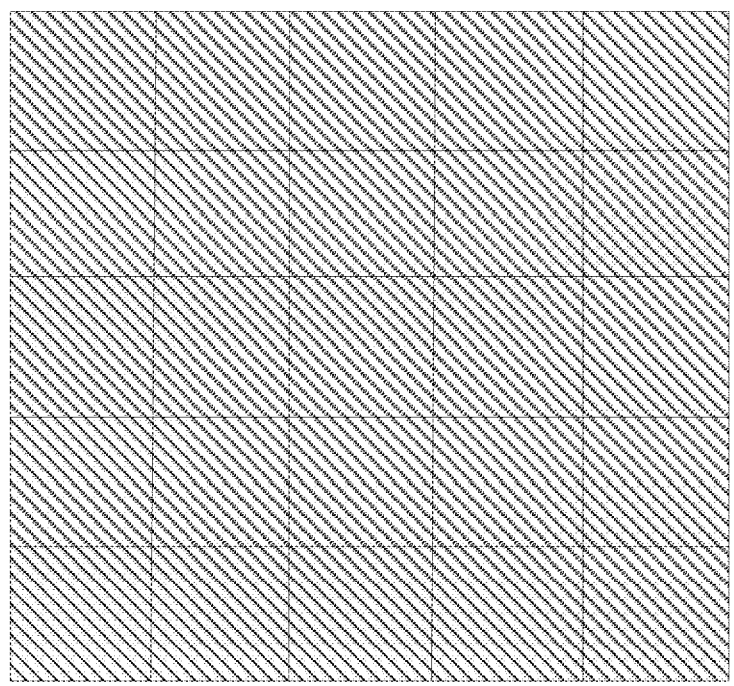
FIG. 6C is a schematic diagram of a first image with a first color depth according to an embodiment of the present disclosure.
Figure 6D:
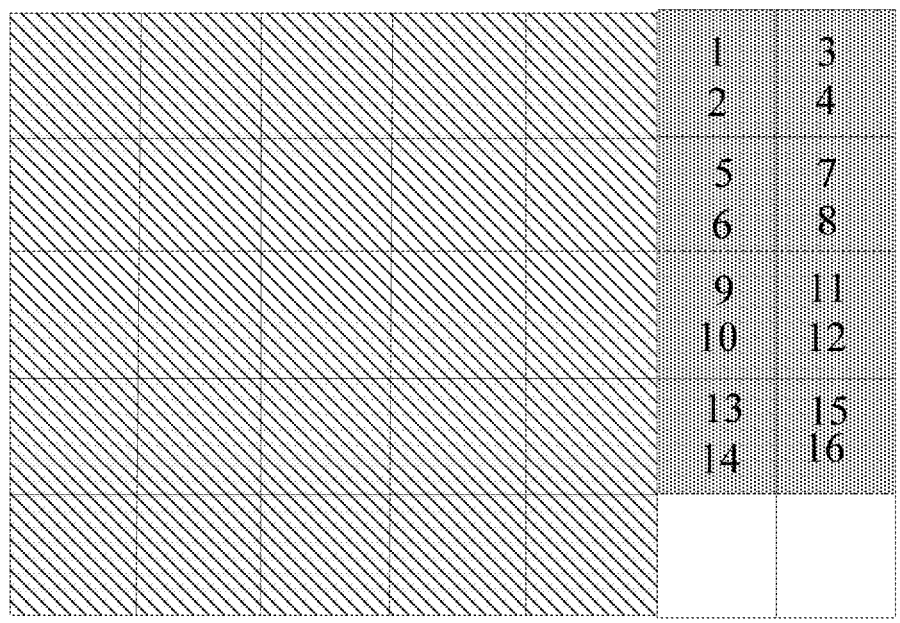
FIG. 6D is a schematic diagram of an image to be decoded with a third color depth according to an embodiment of the present disclosure.
Figure 6E:
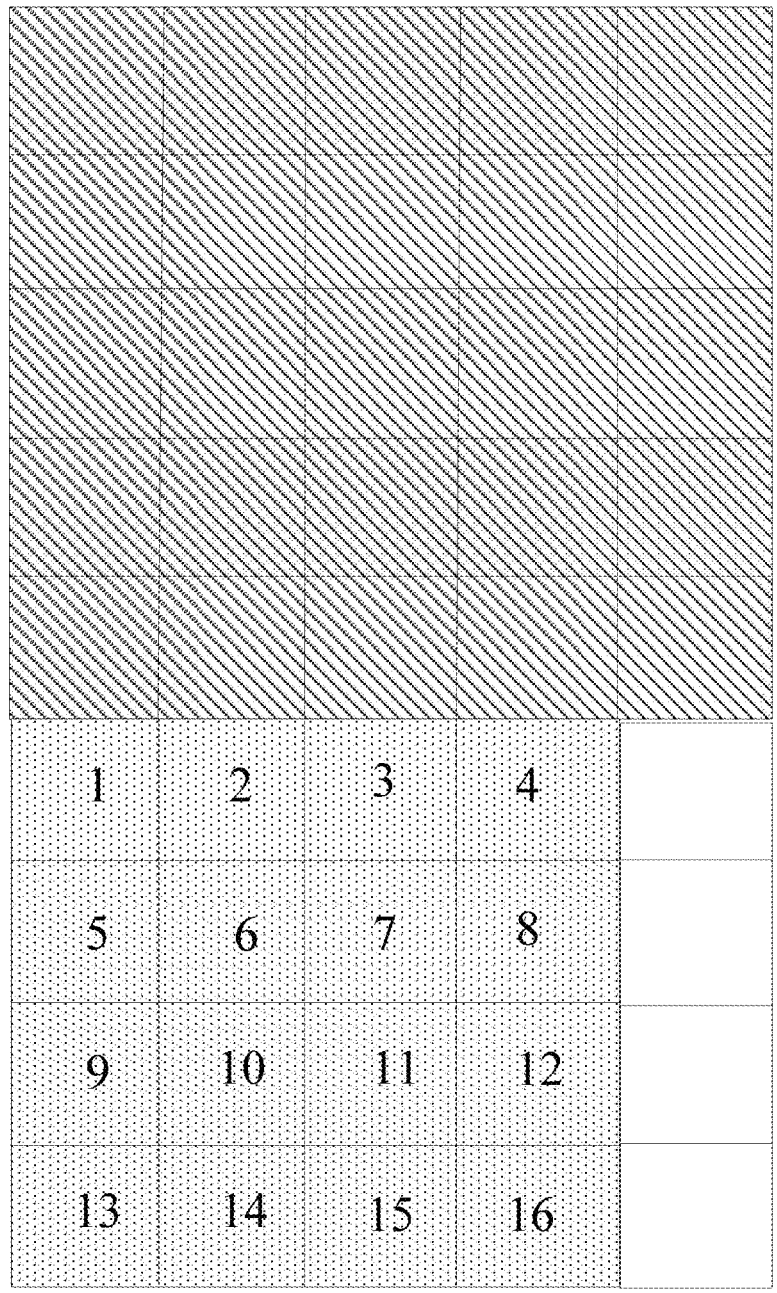
FIG. 6E is a schematic diagram of a mosaic image with a first color depth.

For example, taking a first color depth being 8-bit and a second color depth being 4-bit as an example, as shown in FIGS. 6A to 6D, an encoded second image with the first color depth as shown in FIG. 6B is generated by merging every two columns of pixel values in the second image with the second color depth as shown in FIG. 6A into one column of pixel values in the encoded second image as shown in FIG. 6B. Furthermore, an image to be decoded with a third color depth (at this time, the third color depth is equal to the first color depth) as shown in FIG. 6D may be obtained by splicing the first image with the first color depth as shown in FIG. 6C with the encoded second image with the first color depth as shown in FIG. 6B. Sometimes, a spliced image with the first color depth as shown in FIG. 6E is obtained by directly splicing the first image with the first color depth with the second image with the second color depth. In this way, as shown in FIG. 6D and FIG. 6E, the quantity of pixels of the new encoded second image is reduced by half of that in the original second image, which reduces image transmission bandwidths to a great extent, therefore, compared with the transmission bandwidths required for transmitting the mosaic images with the first color depth as shown in FIG. 6E obtained in some technologies, the transmission bandwidths required for transmitting the image to be decoded with the first color depth as shown in FIG. 6D obtained in the embodiment of the present disclosure is smaller. Furthermore, power consumption of the device may be reduced, which may be beneficial to the popularity of the virtual reality system at a lower cost.

For example, taking merging 4-bit depth sub-pixels into 8-bit depth sub-pixels as an example, how to merge every 2 columns of pixel values in the second image into one column of pixel values in the encoded second image (that is, how to merge two low-bit depth sub-pixels into high-bit depth sub-pixels) is explained.

When encoding, because the color depth of the second image is 4 bits, every one column of pixel values in the second image is binarized as a 4-bit binary number. Then, the 4-bit binary number obtained by binarizing pixel values in odd columns in every 2 columns of pixel values in the second image may be taken as upper 4 bits of 8-bit depth sub-pixels, and the 4-bit binary number obtained by binarizing pixel values in even columns in every 2 columns of pixel values in the second image may be taken as lower 4 bits of 8-bit depth sub-pixels, a decimal value of this 8-bit depth sub-pixel is calculated as a sub-pixel value in the encoded second image.

In the above embodiment, when a first color depth may not be divided by a second color depth, act 5031 may include merging every G column of pixel values and H column of blank pixel values in the second image into a column of pixel values in the encoded second image to generate the encoded second image, where G is a quotient obtained by dividing the first color depth by the second color depth and H is a remainder obtained by dividing the first color depth by the second color depth.

For example, if a first color depth is 10 bits, a second color depth is 4 bits, and a third color depth is equal to the first color depth, every two columns of pixel values in a second image with the second color depth and two columns of blank pixel values may be merged into one column of pixel values in an encoded second image to generate an encoded second image with the first color depth. Furthermore, an image to be decoded with the third color depth may be obtained by splicing the first image with the first color depth and the encoded second image with the first color depth. In this way, compared with transmission bandwidths required to transmit mosaic images with the first color depth shown in FIG. 6E obtained by splicing the first image with the first color depth with the second image with the second color depth in some technologies, the transmission bandwidths required to transmit the images to be decoded with the first color depth obtained in the embodiment of the present disclosure is smaller, and further, power consumption of device may be reduced.

In an exemplary embodiment, when a third color depth is a common multiple between a first color depth and a second color depth, act 503 may include the following acts 5033 to 5035:

act 5033: encoding a first image to obtain an encoded first image with a third color depth based on the common multiple between the first color depth and the second color depth;

act 5034: encoding a second image to obtain an encoded second image with the third color depth based on the common multiple between the first color depth and the second color depth;

act 5035: splicing the encoded first image with the encoded second image to obtain an image to be decoded.

In the above embodiment, act 5033 may include merging every P columns of pixel values in the first image into a column of pixel values in the encoded first image to generate the encoded first image, where P is a quotient obtained by dividing the common multiple by the first color depth.

In the above embodiment, act 5034 may include: merging every Q columns of pixel values in the second image into a column of pixel values in the encoded second image to generate the encoded second image, where Q is a quotient obtained by dividing the common multiple by the second color depth.

For example, taking a first color depth being 8 bits, a second color depth being 6 bits and a third color depth being 24 bits as an example, every three columns of pixel values in a first image with the first color depth are merged into one column of pixel values in an encoded first image to generate an encoded first image with the third color depth; and every four columns of pixel values in a second image with the second color depth are merged into one column of pixel values in an encoded second image to generate an encoded second image with the third color depth. Furthermore, an image to be decoded with the third color depth may be obtained by splicing the encoded first image with the third color depth with the encoded second image with the third color depth, In this way, compared with transmission bandwidths required to transmit mosaic images with the first color depth obtained by splicing the first image with the first color depth with the second image with the second color depth in some technologies, the transmission bandwidths required to transmit the images to be decoded with the third color depth obtained in the embodiment of the present disclosure is smaller, and further, power consumption of the device may be reduced.

As may be seen from the above, according to the data processing method provided by the embodiment of the present disclosure, on the one hand, the virtual reality host device renders a first image with a first color depth (i.e., an image with a high color depth, or an image with a high definition) with a high bit pixel format based on first data of the first image with the first color depth displayed in a fixation region of the display panel of the virtual reality display device, and renders a second image with a second color depth (i.e., an image in a low color depth or an image in a low definition) with a low bit pixel format based on second data of the second image with the second color depth displayed in a non-fixation region of the display panel. Compared with a traditional fixation point rendering method, this method further reduces rendering pressure of the processing module (e.g., processor) in the virtual reality host device on the basis of ensuring display effects of the high definition images. On the other hand, since the quantity of pixels in the encoded second image is partially reduced, the data amount of the image to be decoded obtained by splicing the first image with the encoded second image is reduced, and thus the transmission bandwidths may be reduced. Alternatively, since the quantity of pixels of both the encoded first image and the encoded second image are partially reduced, the data amount of the image to be decoded obtained by splicing the encoded first image with the encoded second image is greatly reduced, and thus the transmission bandwidths may be significantly reduced.

Figure 7:
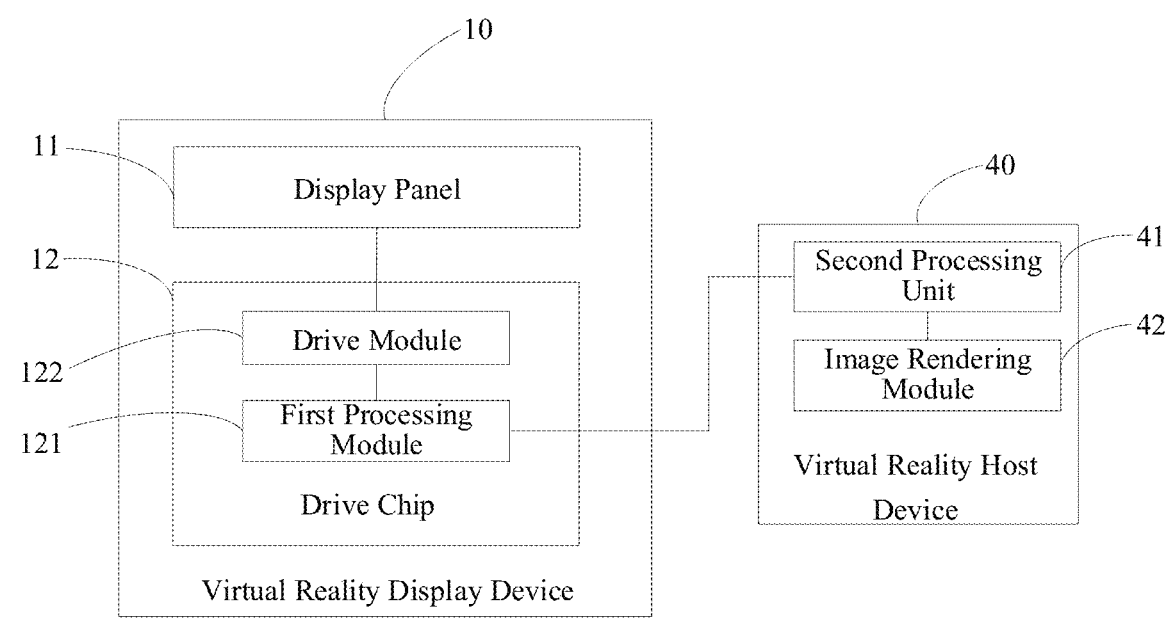
FIG. 7 is a schematic diagram of a structure of a virtual reality system according to an embodiment of the present disclosure.

An embodiment of the present disclosure further provides a virtual reality system, and FIG. 7 is a schematic diagram of a structure of the virtual reality system according to the embodiment of the present disclosure. As shown in FIG. 7, the virtual reality system may include the virtual reality display device 10 in one or more exemplary embodiments described above (e.g., wearable devices such as a virtual reality helmet and virtual reality glasses) and the virtual reality host device 40 in one or more exemplary embodiments described above.

In an exemplary embodiment, the virtual reality display device and the virtual reality host device may be physically disposed in combination or in separation, which is not limited in the embodiments of the present disclosure. For example, when the virtual reality display device and the virtual reality host device are disposed in combination, an all-in-one VR device may be formed; and when the virtual reality display device and the virtual reality host device are disposed in separation, a split VR device may be formed.

In an exemplary embodiment, when the virtual reality host device and the virtual reality display device are physically disposed in separation, the virtual reality host device may be a Personal Computer (PC). When the virtual reality host device and the virtual reality display device are physically disposed in combination, the virtual reality host device may be an Application Processor (AP) in the virtual reality display device.

Those of ordinary skill in the art may understand that all or some of the acts in the method, the system, and functional modules/units in the device disclosed above may be implemented as software, firmware, hardware, and an appropriate combination thereof. In a hardware implementation, the division between functional modules/units mentioned in the above description does not necessarily correspond to the division of physical components. For example, a physical component may have a plurality of functions, or a function or an act may be performed by several physical components in cooperation. Some or all of the components may be implemented as software executed by a processor, such as a digital signal processor or a microprocessor, or as hardware, or as an integrated circuit, such as an application specific integrated circuit. Such software may be distributed on a computer readable medium, which may include a computer storage medium (or a non-transitory medium), and a communication medium (or a transitory medium). As is well known to those of ordinary skill in the art, the term "computer storage medium" includes volatile and nonvolatile, removable and non-removable media implemented in any method or technology for storing information (such as computer readable instructions, a data structure, a program module or other data). Computer storage media include, but are not limited to, Random Access Memory (RAM), Read Only Memory (ROM), EEPROM, Flash RAM or other memory technologies, CD-ROM, digital versatile disk (DVD) or other optical disk storage, magnetic cassettes, magnetic tapes, magnetic disk storage or other magnetic storage apparatuses, or any other media that may be used to store desired information and may be accessed by computers. Furthermore, it is well known to those of ordinary skill in the art that the communication medium typically contains computer readable instructions, a data structure, a program module, or other data in a modulated data signal such as a carrier or another transmission mechanism, or the like, and may include any information delivery medium.

What we claim is:

1. A virtual reality display device, comprising:
    a display panel and a drive chip, wherein:
    the drive chip comprises a first processing module and a drive module, wherein the drive module is connected to the first processing module and the display panel;
    the first processing module is configured to decode an image to be decoded with a third color depth sent by a second processing module in a virtual reality host device to obtain a first image with a first color depth displayed in a fixation region of the display panel and a second image with a second color depth displayed in a non-fixation region of the display panel, wherein the third color depth is greater than or equal to the first color depth and the second color depth is smaller than the first color depth;
    the drive module is configured to generate a first data voltage corresponding to the first image based on the first image and a second data voltage corresponding to the second image based on the second image; apply the first data voltage to the fixation region of the display panel and apply the second data voltage to the non-fixation region of the display panel to drive the display panel to display an image with the first color depth in the fixation region and with the second color depth in the non-fixation region;
    the display panel comprises M rows and N columns of sub-pixels and N columns of data lines, wherein an ith column of data lines is connected to an ith column of sub-pixels, M and N are positive integers, and i is a positive integer less than or equal to N;
    the drive module comprises a voltage generation unit, a digital-to-analog conversion unit and a multiplexer circuit;
    the multiplexer circuit is connected to the N columns of data lines;
    the voltage generation unit is configured to generate a first reference voltage for digital-to-analog conversion of a first digital voltage signal corresponding to the first image and generate a second reference voltage for digital-to-analog conversion of a second digital voltage signal corresponding to the second image; and
    the digital-to-analog conversion unit is connected to the first processing module, the voltage generation unit and the multiplexer circuit and is configured to perform a digital-to-analog conversion on the first digital voltage signal based on the first reference voltage to generate a first analog voltage signal corresponding to the first digital voltage signal; perform a digital-to-analog conversion on the second digital voltage signal based on the second reference voltage to generate a second analog voltage signal corresponding to the second digital voltage signal; and control the multiplexer circuit to apply the first analog voltage signal as the first data voltage to the fixation region in the display panel and apply the second analog voltage signal as the second data voltage to the non-fixation region in the display panel to drive the display panel to display the image in the first color depth in the fixation region and in the second color depth in the non-fixation region.

2. The virtual reality display device of claim 1, wherein the voltage generation unit comprises a resistor-string (R-string), a first output terminal and a second output terminal, wherein
    the R-string is configured to divide voltage of an original reference voltage to generate the first reference voltage and the second reference voltage;
    a first output terminal of the voltage generation unit is configured to output the first reference voltage to the digital-to-analog conversion unit; and
    a second output terminal of the voltage generation unit is configured to output the second reference voltage to the digital-to-analog conversion unit, wherein a quantity of the second reference voltage is smaller than a quantity of the first reference voltage.

3. The virtual reality display device of claim 2, wherein the digital-to-analog conversion unit comprises a first sub-digital-to-analog conversion unit and a second sub-digital-to-analog conversion unit, wherein a first input terminal of the first sub-digital-to-analog conversion unit is connected to the first processing module, a second input terminal of the first sub-digital-to-analog conversion unit is connected to a first output terminal of the voltage generation unit, and an output terminal of the first sub-digital-to-analog conversion unit is connected to the multiplexer circuit; the first sub-digital-to-analog conversion unit is configured to perform digital-to-analog conversion processing on the first digital voltage signal based on the first reference voltage to generate a first analog voltage signal corresponding to the first digital voltage signal; control the multiplexer circuit to apply the first analog voltage signal as the first data voltage to the fixation region in the display panel to drive the display panel to display the image with the first color depth in the fixation region;

a first input terminal of the second sub-digital-to-analog conversion unit is connected to the first processing module, a second input terminal of the second sub-digital-to-analog conversion unit is connected to a second output terminal of the voltage generation unit, and an output terminal of the second sub-digital-to-analog conversion unit is connected to the multiplexer circuit; the second sub-digital-to-analog conversion unit is configured to perform digital-to-analog conversion processing on the second digital voltage signal based on the second reference voltage to generate a second analog voltage signal corresponding to the second digital voltage signal; control the multiplexer circuit to apply the second analog voltage signal as the second data voltage to the non-fixation region in the display panel to drive the display panel to display the image with the second color depth in the non-fixation region.

4. The virtual reality display device of claim 3, wherein the multiplexer circuit comprises a first group of multiplexer units and a second group of multiplexer units, wherein the first group of multiplexer units comprises N first multiplexer units, wherein an input terminal of an ith first multiplexer unit is connected to an output terminal of the first sub-digital-to-analog conversion unit, and an output terminal of the ith first multiplexer unit is connected to a data line in an ith column, i is a positive integer less than or equal to N;

the second group of multiplexer units comprises N second multiplexer units, wherein an input terminal of an ith second multiplexer unit is connected to an output terminal of the second sub-digital-to-analog conversion unit, and an output terminal of the ith second multiplexer unit is connected to the data line in the ith column;

the first sub-digital-to-analog conversion unit is configured to control the first group of multiplexer units to apply the first analog voltage signal as the first data voltage to the fixation region in the display panel to drive the display panel to display the image with the first color depth in the fixation region; and the second sub-digital-to-analog conversion unit is configured to control the second group of multiplexer units to apply the second analog voltage signal as the second data voltage to the non-fixation region in the display panel to drive the display panel to display the image with the second color depth in the non-fixation region.

5. A data processing method, applied to the virtual reality display device of claim 1, the method comprising:

decoding an image to be decoded with a third color depth sent by a virtual reality host device to obtain a first image with a first color depth displayed in a fixation region of a display panel of the virtual reality display device and a second image with a second color depth displayed in a non-fixation region of the display panel, wherein the third color depth is greater than or equal to the first color depth, and the second color depth is smaller than the first color depth;

generating a first data voltage corresponding to the first image based on the first image and a second data voltage corresponding to the second image based on the second image;

applying the first data voltage to the fixation region and applying the second data voltage to the non-fixation region of the display panel to drive the display panel to display the image with the first color depth in the fixation region and with the second color depth in the non-fixation region.

6. A virtual reality host device, comprising:

a second processing module and an image rendering module connected to the second processing module, wherein the second processing module is configured to obtain first data for generating a first image with a first color depth displayed in a fixation region in a display panel of a virtual reality display device and second data for generating a second image with a second color depth displayed in a non-fixation region in the display panel;

control the image rendering module to render the first image based on the first data and render the second image based on the second data;

encode the first image and the second image based on the first color depth and the second color depth to obtain an image to be decoded with a third color depth; and send the image to be decoded to a first processing module in the virtual reality display device, wherein the third color depth is greater than or equal to the first color depth, and the second color depth is smaller than the first color depth, wherein the second processing module is configured to encode the first image and the second image to obtain the image to be decoded with the third color depth based on the first color depth and the second color depth in the following manner:

the second processing module is configured to, in a case that the third color depth is equal to the first color depth, encode the second image to obtain an encoded second image with a first color depth based on whether the first color depth is divided by the second color depth evenly; and splice the first image with the encoded second image to obtain the image to be decoded, or wherein the second processing module is configured to encode the first image and the second image to obtain the image to be decoded with the third color depth based on the first color depth and the second color depth in the following manner:

the second processing module is configured to, in a case that the third color depth is a common multiple between the first color depth and the second color depth, encode the first image based on a common multiple between the first color depth and the second color depth to obtain an encoded first image with a third color depth; encode the second image based on a common multiple between the first color depth and the second color depth to obtain an encoded second image with a third color depth; splice the encoded first image and the encoded second image to obtain an image to be decoded.

7. The virtual reality host device of claim 6, wherein the second processing module is configured to encode the second image to obtain the encoded second image with the first color depth based on whether the first color depth is divided by the second color depth in the following manner:
the second processing module is configured to, in a case that the first color depth is divided by the second color depth evenly, merge every K columns of pixel values in the second image into a column of pixel values in the encoded second image to generate the encoded second image, where K is a quotient obtained through dividing the first color depth by the second color depth.

8. The virtual reality host device of claim 6, wherein the second processing module is configured to encode the second image to obtain the encoded second image with the first color depth based on whether the first color depth is divided by the second color depth in the following manner:
the second processing module is configured to, in a case that the first color depth is not divided by the second color depth evenly, merge every G columns of pixel values in the second image and H columns of blank pixel values into a column of pixel values in the encoded second image, and generate the encoded second image, wherein G is a quotient obtained through dividing the first color depth by the second color depth, H is a remainder obtained through dividing the first color depth by the second color depth.

9. The virtual reality host device of claim 6, wherein the second processing module is configured to encode the first image to obtain the encoded first image with the third color depth based on the common multiple between the first color depth and the second color depth in a following manner: the second processing module is configured to merge every P columns of pixel values in the first image into a column of pixel values in the encoded first image to generate the encoded first image, where P is a quotient obtained by dividing the common multiple by the first color depth;
the second processing module is configured to encode the second image to obtain the encoded second image with the third color depth based on the common multiple between the first color depth and the second color depth in a following manner: the second processing module is configured to merge every Q columns of pixel values in the second image into a column of pixel values in the encoded second image to generate the encoded second image, where Q is a quotient obtained by dividing the common multiple by the second color depth.

10. A data processing method, applied to a virtual reality host device, the method comprising:
obtaining first data for generating a first image with a first color depth displayed in a fixation region in a display panel of a virtual reality display device and second data for generating a second image with a second color depth displayed in a non-fixation region in the display panel, wherein the second color depth is smaller than the first color depth;
rendering the first image based on the first data, and rendering the second image based on the second data through an image rendering module in the virtual reality host device;
encoding the first image and the second image to obtain an image to be decoded with a third color depth based on the first color depth and the second color depth, wherein the third color depth is greater than or equal to the first color depth; and
sending the image to be decoded to the virtual reality display device,
wherein encoding the first image and the second image to obtain the image to be decoded with the third color depth based on the first color depth and the second color depth comprises:
in a case that the third color depth is equal to the first color depth, encoding the second image based on whether the first color depth is divided by the second color depth evenly, to obtain an encoded second image with a first color depth, and
splicing the first image with the encoded second image to obtain the image to be decoded, or
wherein encoding the first image and the second image to obtain the image to be decoded with the third color depth based on the first color depth and the second color depth comprises:
encoding the first image based on a common multiple between the first color depth and the second color depth when the third color depth is the common multiple between the first color depth and the second color depth, to obtain an encoded first image with the third color depth;
encoding the second image based on a common multiple between the first color depth and the second color depth, to obtain an encoded second image with the third color depth; and
splicing the encoded first image with the encoded second image to obtain the image to be decoded.

11. The data processing method of claim 10, wherein encoding the second image based on whether the first color depth is divided by the second color depth evenly to obtain the encoded second image with the first color depth comprises:
merging every K columns of pixel values in the second image into a column of pixel values in the encoded second image to generate the encoded second image when the first color depth is divided by the second color depth evenly, where K is a quotient obtained through dividing the first color depth by the second color depth.

12. The data processing method of claim 10, wherein encoding the second image based on whether the first color depth is divided by the second color depth evenly to obtain an encoded second image with a first color depth comprises:
merging every G columns of pixel values in the second image and H columns of blank pixel values into a column of pixel values in the encoded second image to generate the encoded second image when the first color depth is not divided by a second color depth, where G is a quotient obtained by dividing the first color depth by the second color depth and H is a remainder obtained by dividing the first color depth by the second color depth.

13. The data processing method of claim 10, wherein encoding the first image based on the common multiple between the first color depth and the second color depth, to obtain the encoded first image with the third color depth comprises: merging every P columns of pixel values in the first image into a column of pixel values in the encoded first image to generate the encoded first image, where P is a quotient obtained through dividing the common multiple by the first color depth.

14. The data processing method of claim 10, wherein, encoding the second image based on the common multiple between the first color depth and the second color depth to obtain the encoded second image with the third color depth comprises: merging every Q columns of pixel values in the second image into a column of pixel values in the encoded second image to generate the encoded second image, where Q is a quotient obtained through dividing the common multiple by the second color depth.

15. A virtual reality system, comprising: a virtual reality host device and the virtual reality display device of claim 1, wherein
the virtual reality host device comprises a second processing module and an image rendering module connected to the second processing module, wherein
the second processing module is configured to
obtain first data for generating the first image with the first color depth displayed in the fixation region in the display panel of the virtual reality display device and second data for generating the second image with the second color depth displayed in the non-fixation region in the display panel;
control the image rendering module to render the first image based on the first data and render the second image based on the second data;
encode the first image and the second image based on the first color depth and the second color depth to obtain the image to be decoded with the third color depth; and
send the image to be decoded to the first processing module in the virtual reality display device, wherein the third color depth is greater than or equal to the first color depth, and the second color depth is smaller than the first color depth.

* * * * *